Figure 1:
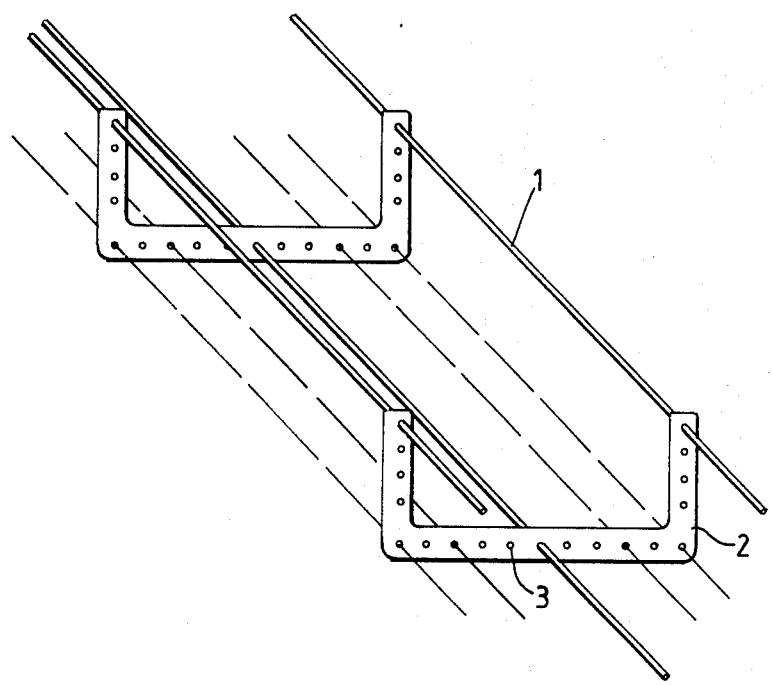

United States Patent [19]
Peled

[11] Patent Number: 4,765,576
[45] Date of Patent: Aug. 23, 1988

[54] LOAD BEARING SUPPORT PLATFORM

[76] Inventor: Uri Peled, Kibbutz Masada, D.N. Emek Hayarden, Israel

[21] Appl. No.: 2,899

[22] Filed: Jan. 13, 1987

[51] Int. Cl.$^4$ .............................................. F16L 3/00
[52] U.S. Cl. .................................... 248/49; 248/68.1
[58] Field of Search ............ 248/49, 68.1; 174/68 C, 174/72 A; 211/182; 52/660, 661

[56] References Cited

U.S. PATENT DOCUMENTS

| | | | |
|---|---|---|---|
| 760,167 | 5/1904 | Warner | 52/654 X |
| 2,891,750 | 6/1959 | Bergquist | 248/68.1 X |
| 3,598,349 | 8/1971 | Drake | 248/49 |
| 3,923,277 | 12/1975 | Perrault et al. | 248/49 |
| 3,948,473 | 4/1976 | Mason | 174/68 C X |
| 3,999,727 | 12/1976 | Rennemann | 211/182 X |
| 4,056,251 | 11/1977 | Dixon | 248/346 X |
| 4,295,317 | 10/1981 | Van Tielen | 52/654 X |
| 4,319,724 | 3/1982 | Bradbury | 248/49 |

FOREIGN PATENT DOCUMENTS

| | | | |
|---|---|---|---|
| 2358863 | 5/1974 | Fed. Rep. of Germany | 248/49 |
| 1322281 | 2/1963 | France | 248/49 |
| 305515 | 5/1955 | Switzerland | 248/49 |

Primary Examiner—J. Franklin Foss
Attorney, Agent, or Firm—Browdy and Neimark

[57] ABSTRACT

A load bearing support platform, in particular a platform for use in industrial installations, for the support of electric cables, comprising a plurality of longitudinally extending support bearing elements, preferably formed of reinforced plastics material. A succession of transverse cross-pieces are provided, each cross-piece being formed with a succession of element locating means, preferably through-going ports. Each element is respectively associated with a separate locating means and is supported by the cross-pieces. Element coupling means are provided for coupling adjacent ends of the elements together.

14 Claims, 7 Drawing Sheets

1a 1b
1d

1c

LOAD BEARING SUPPORT PLATFORM

FIELD OF INVENTION

This invention relates to a load bearing support platform and is in particular, but not exclusively, concerned with load bearing platforms of the kind used in industrial installations for the support of electric cables.

BACKGROUND OF THE INVENTION

Such cable support platforms or, as they are usually referred to, cable support ladders have, in the past, generally been made of metal and this has given rise to serious problems of corrosion, especially when used in chemical plants and also to problems of insulating safety. Some attempts have been made in the past to manufacture such platforms or ladders of reinforced plastics material but they have not proven to be commercially successful as an alternative to the existing metal platforms, particularly in view of the requirement for such platforms to be capable of ready variation of direction angle, etc. Whilst this requirement can be readily achieved with metal platforms, attempting to satisfy the requirement with platforms formed of plastics material has involved the use of very expensive bonded junctions which, in addition to their high cost, are not always reliable in use.

SUMMARY OF THE INVENTION

It is an object of the present invention to provide a new and improved load bearing support platform particularly, but not exclusively, for use with electric cables, in which the above-referred-disadvantages are substantially reduced or avoided.

According to the present invention there is provided a load bearing support platform comprising a plurality of longitudinally extending, support bearing elements;

a succession of transverse cross pieces, each cross piece being formed with a succession of element locating means, said elements being respectively associated with said locating means and being supported by said cross beams; and element coupling means for coupling adjacent ends of the elements together, Preferably, and in particular when the platform is used as a cable support platform, the constituent components thereof are all formed of plastics material with the support bearing elements being formed of a reinforced plastics material, preferably a continuous strand fiberglass reinforced plastics material. The elements are suitably formed by pulling the strands through a resin bath and an appropriate series of dies. Such a technique for forming the elements is known as pultrusion.

The elements themselves can be of substantially oval cross section shape, preferably hollow with a suitable core material, whilst the locating means in the cross pieces are respectively constituted by through-going ports through which the elements pass. The elements can be locked in position by suitable locking means such as, for example, wedge pieces inserted on either side of the elements within the ports.

In one preferred embodiment the cross pieces are of substantially U-shape with the ports being formed in the substantially horizontal and vertical limbs thereof.

The support elements themselves can be coupled together by coupling sleeves which are so formed as to allow for the coupling of successive elements either in an aligned position or at any appropriate angle.

The support platforms thus formed in accordance with the invention can be suitably supported with respect to a floor or base surface, with respect to a wall surface, or can be suspended from a ceiling surface.

In all cases, however, it is a characteristic feature of the support platform in accordance with the present invention that it can be readily adapted to support differing loads by varying the number of longitudinal support elements employed. Thus, if a particularly heavy load is to be supported, then an increased number of longitudinal support elements can be used, whilst if a relatively light load is to be supported, the number of longitudinal elements can be suitably reduced. It will therefore be readily seen that the support platform construction in accordance with the present invention constitutes a modular construction which can be readily adapted for differing types of loads.

Figure 2:
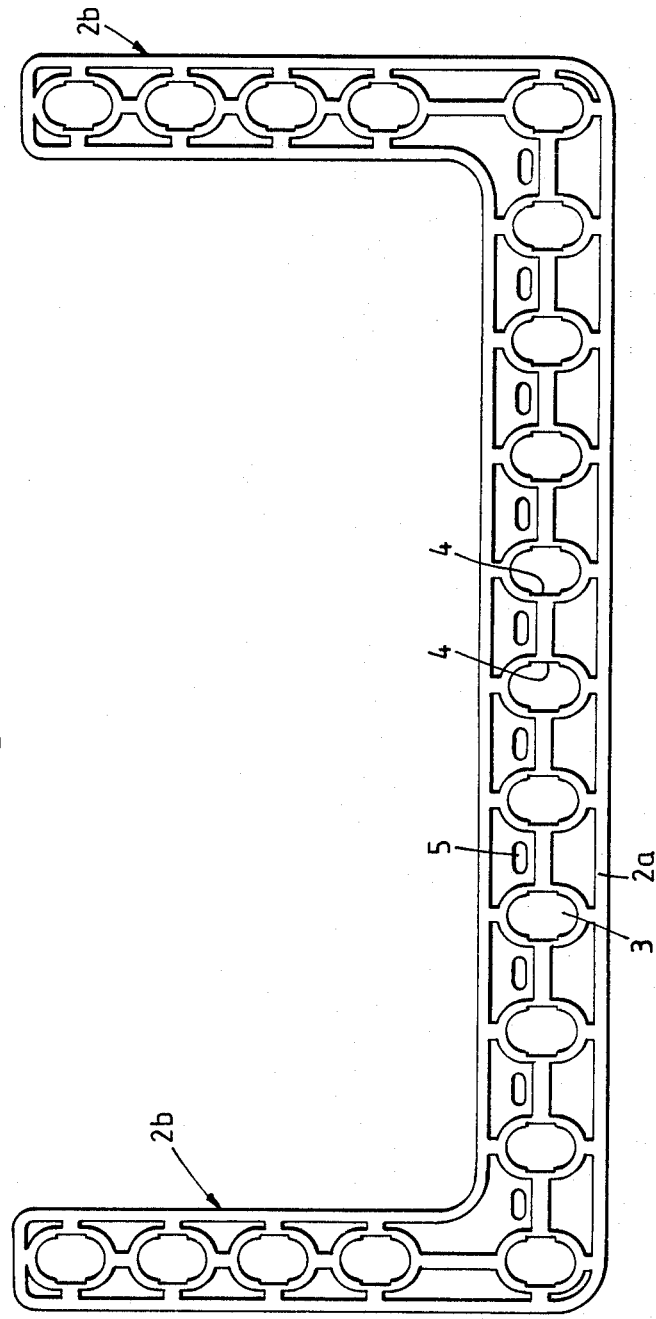
Figure 3:
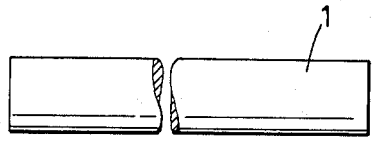
Figure 4A:
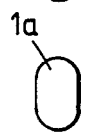
Figure 4B:
Figure 4C:
Figure 5:
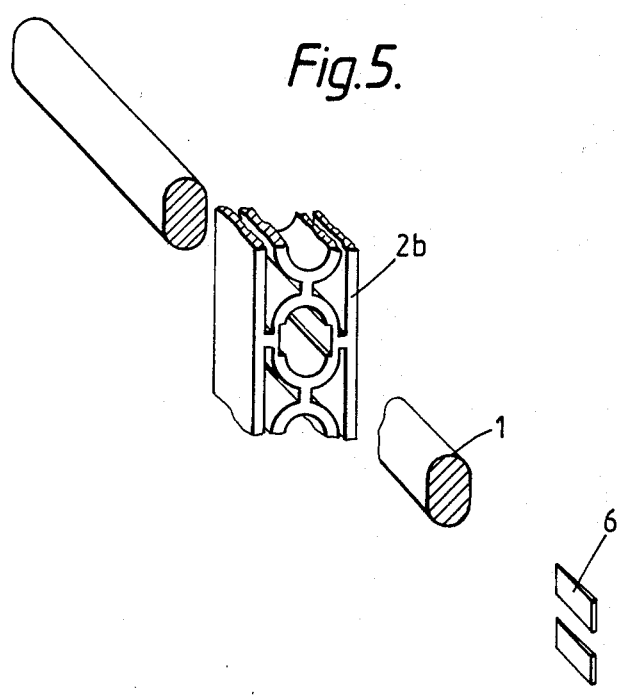
Figure 6A:
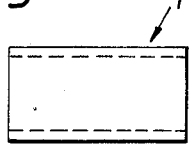
Figure 6B:
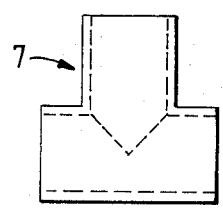
Figure 6C:
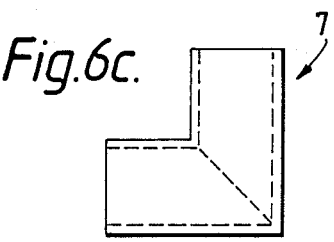
Figure 6D:
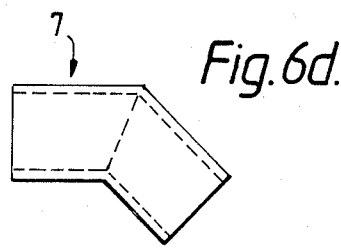
Figure 7:
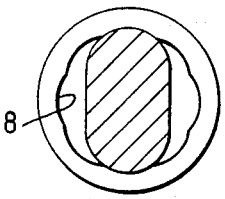
Figure 8:
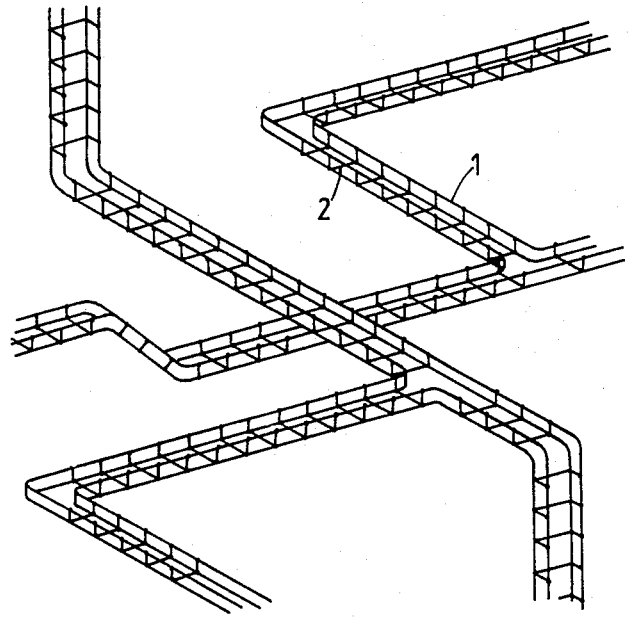
Figure 9:
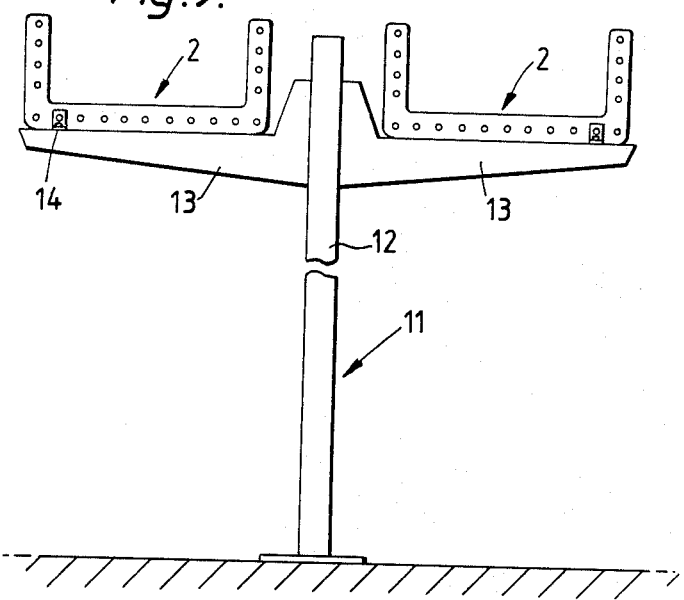
Figure 10:
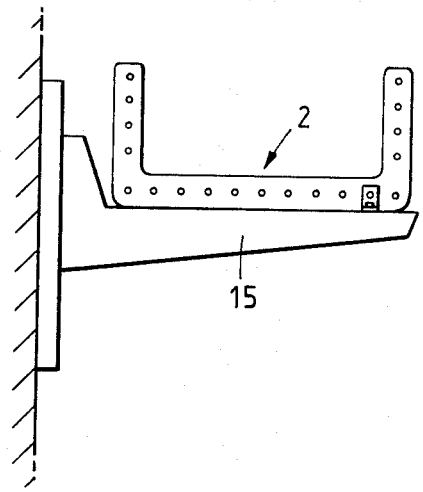
Figure 11:
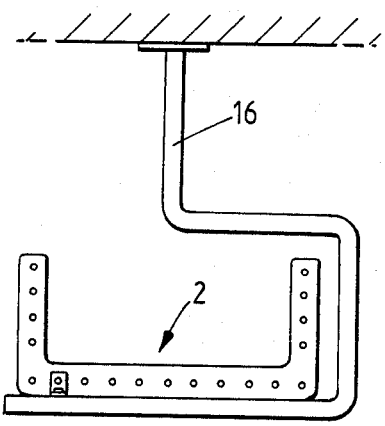
Figure 12:
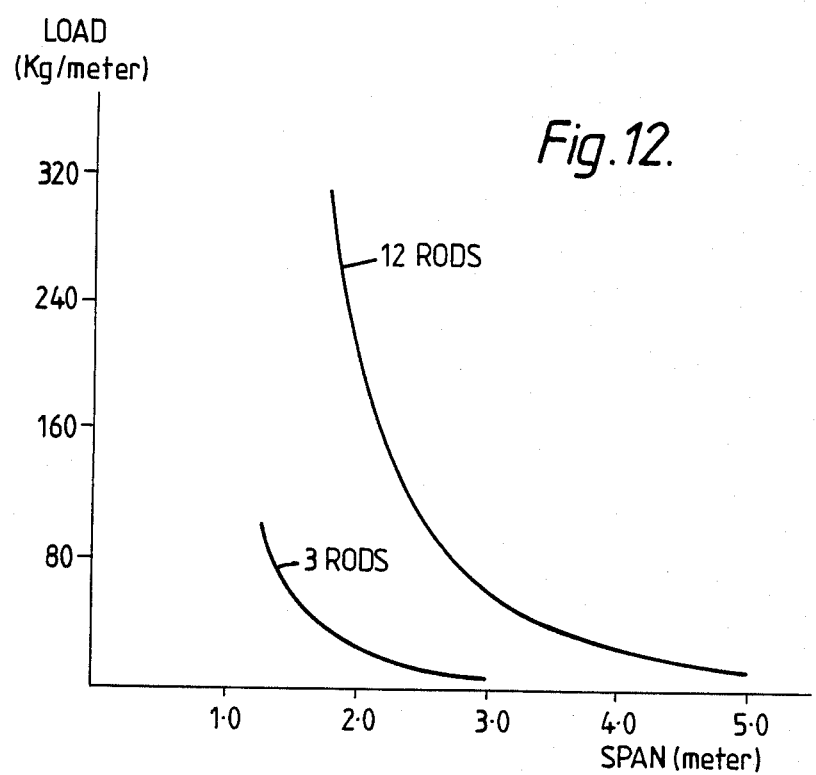

For a better understanding of the present invention and to show how the same may be carried out in practice, reference will now be made to the accompanying drawings, in which FIG. 1 is a schematic perspective view of a portion of a cable support platform in accordance with the invention, FIG. 2 is a side elevation of a U-shaped cross piece forming part of the support platform shown in FIG. 1, FIG. 3 is a side elevation of a longitudinal support element forming part of the support platform shown in FIG. 1, FIGS. 4a, 4b and 4c are cross-sectional views of differing forms of support elements of the kind shown in FIG. 3, FIG. 5 is a diagrammatic view of the insertion and retention of a support element as shown in FIG. 3 in a U-shaped cross-piece as shown in FIG. 2, FIGS. 6a, 6b, 6c and 6d are side views of coupling elements for use in the support platform, FIG. 7 is a cross-sectional view of such a coupling element with a support element inserted, FIG. 8 is a perspective view of a composite cable support platform constructed with the elements shown in FIGS. 1 through 7, FIG. 9 illustrates the mode of supporting of a support platform, as shown with reference to FIGS. 1 through 8, on a floor surface, FIG. 10 shows a mode of supporting of a support platform, as shown in FIGS. 1 through 8, on a wall surface, FIG. 11 shows a mode of suspension of a platform, as shown with reference to FIGS. 1 through 8, from a ceiling surface, and FIG. 12 shows a pair of curves illustrating the variation of span (distance between supported cross-pieces) with differing loads for platforms having between three to twelve support rods.

As seen in FIG. 1 of the drawings, a cable support platform consists of a plurality of longitudinally extending rods 1 (constituting a support bearing elements) and a succession of U-shaped transverse cross pieces 2. Each transverse cross-piece has formed in its horizontal and vertical limbs through-going ports 3 into or through which the rods 1 extend. As can be seen from FIG. 1 of the drawings, the number of rods 1 which extend between successive cross-pieces 2 can be readily varied in accordance with the load which the platform is designed to bear.

Reference will now be made to FIGS. 2 through 4 of the drawings for a more detailed description of the load bearing rods 1 and cross-pieces 2.

As seen in FIG. 2 of the drawings, each U-shaped cross-piece 2 comprises a horizontal limb 2a and a pair of vertical limbs 2b, there being formed in the horizontal and vertical limbs a succession of through-going ports 3. Each port 3, which is of substantially oval cross-sectional shape, is formed at opposite sides thereof with a pair of internal tapering recesses 4. The horizontal limb 2a is furthermore formed with a succession of through-going apertures 5.

As seen in FIGS. 3, 4 and 5 of the drawings, the longitudinal support rods 1 are of substantially oval cross-sectional shape and can appropriately be solid rods 1a as shown in FIG. 4a, hollow rods 1c as shown in FIGS. 4c and hollow rods 1b with a filling core 1d as shown in FIG. 4b.

The rods 1 themselves are formed of a reinforced plastics material suitably of a continuous fiberglass strand material which has been passed through a resin bath and pulled through an appropriate die by a pultrusion technique. Where, as shown in FIG. 4b, the rod 1b is formed with an appropriate core 1d, the latter can suitably be of polyvinyl chloride material.

As can be seen clearly in FIG. 5 of the drawings, the rod 1 passes through the port 3 and is locked in position by means of a pair of wedge shaped locking pieces 6 which are inserted into the tapering recesses 4, thereby preventing relative movement of the rod and the cross-piece.

The rods can be coupled together by coupling elements 7 as shown in FIGS. 6 and 7 of the drawings. Each coupling element 7 comprises at least two integrally formed sleeves into which are designed to be inserted the ends of the rods to be coupled together. FIG. 6a shows a coupling element 7a for the aligned coupling together of the rods. FIG. 6b shows such a coupling element 7b for the coupling together in a T junction of two aligned rods and a third rod designed to be located at right angles to the aligned rod. FIG. 6c shows a right angle coupling element 7c for the coupling together of two rods at right angles to each other, and FIG. 6d shows a coupling element 7d with the constituent sleeves disposed at an angle to each other for the coupling together of the rods with a relative angular disposition with respect to each other.

FIG. 7 shows the cross-sectional shape of one of the constituent sleeves of any of the coupling elements 7 shown in FIGS. 6a through 6d. As can be seen, the rod 1 fits into this sleeve, which is formed on either side of the space occupied by the rod with a tapering recess 8 into which can be fitted wedge-like locking elements (not shown) for the locking of the rod ends in the coupling pieces 7 in a manner similar to the locking of the rods 1 within the ports 3 of the cross-pieces 2.

It will be readily seen that with the basic elements just described, i.e., the support rods 1, the transverse cross piece 2 and the differing forms of coupling elements shown in FIGS. 6a to 6d, composite platform structures can be constructed on a modular basis wherein the component platform elements can be directed in any desired fashion and at any desired angle and elevation. Such a composite structure is diagrammatically illustrated in FIG. 8 of the drawings.

When the platform thus formed is used to support cables (not shown), the latter can be retained in the desired position by being tied to the cross-pieces by tying means (not shown) which pass through.

The cable support platform just described can be readily supported from a floor as shown in FIG. 9 of the drawings. In this construction, a support structure 11 comprises a succession of support pillars 12, each having a pair of support arms 13. Each support arm 13 is designed to support a support platform with the cross-pieces 2 thereof secured by securing means 14 to the support arms 13. Preferably, the cross-pieces 2 can be moulded with suitable means allowing for the ready securing by bolting to the support structure 11.

In an alternative construction shown in FIG. 10 of the drawings, cross-pieces 2 are supported on a succession of support brackets 15 which, in their turn, are secured to a wall. In a still further alternative construction shown in FIG. 11 of the drawings, the support brackets 2 are supported on a structure 16 which is suspended from a ceiling.

It will be readily seen that, with the cable support platform as just described, a very versatile modular structure is provided which can be readily adapted for differing needs, sizes and locations. Thus, the structure lends itself to follow the region wherein it is to be installed by the choice of approximate lengths of support rods and by the choice between a very limited number of coupling elements. Furthermore, and particularly, the cable support structure is particularly useful for supporting differing loads of cables within a relatively limited range of spans by mere variation of the number of longitudinal support rods employed. Thus, where a relatively light load is to be supported only a limited number of support rods need be employed, whilst where a relatively heavy load is to be supported the number of support rods employed can be suitably increased. This is a very distinct advantage over the prior art construction, which had always to be designed so as to accommodate maximum loads.

Furthermore, by virtue of the fact that the cable support platform is formed of plastic material, the support itself is inherently protected against corrosive effects of atmosphere and materials and provides inherent insulation against any breakdown of insulation.

In one characteristic construction, the support rods were formed of a polyester material reinforced with glass fibres and formed by a pultrusion technique, whilst the U-shaped cross-pieces were formed of polyethylene by an injection moulding technique. The coupling pieces, on the other hand, were formed of p.v.s. by an injection moulding technique.

FIG. 12 shows how in a specific design of cable support platform in accordance with the invention and, as just described, the spacing between the supported cross-pieces (the span) varies as the load varies with between three support to twelve support rods 2.

Whilst the invention has been specifically described in connection with the provision of a cable support platform, it will be readily understood that the principles underlying the present invention are readily applicable to the construction of other forms of support platforms.

I claim:

1. A modular system for assembling a load-bearing support platform comprising:
   a plurality of longitudinally extending support elements;
   a succession of cross-pieces, each provided with a succession of means for locating said elements, which elements are respectively associated with said locating means and are supported by said cross-pieces, wherein each cross-piece is formed with a succession of through-going ports respectively constituting said locating means and into or through which said elements extend, and coupling means for joining together adjacent ends of said elements, wherein the number of said longitudinally extending elements per platform is selectively variable between a maximum equaling the number of said element-locating means in said cross-pieces, and a minimum of three.

2. A support platform according to claim 1 wherein said elements are formed of a reinforced plastics material.

3. A support platform according to claim 2 wherein said elements are formed of a continuous strand of fiberglass reinforced plastics material.

4. A support platform according to claim 1 wherein each port is associated with element locking means for lockingly retaining said element in said port.

5. A support platform according to claim 4 wherein each port is formed in the walls thereof with at least one tapering recess adapted to receive at least one locking wedge constituting said locking means.

6. A support platform according to claim 1 wherein said elements are of substantially oval cross-sectional shape.

7. A support platform according to claim 1 wherein said coupling means has the form of sleeve like fittings of selected configurations, each fitting being adapted to receive at least the end portions of the elements to be coupled as well as locking means for locking said portions within said sleeve fitting.

8. A support platform according to claim 7 wherein said configurations include straight, T, elbow and angular configurations.

9. A support platform according to claim 7 wherein each sleeve like fitting is formed with at least one locking wedge.

10. A support platform according to claim 7 and constituting a cable support platform wherein said cross-piece is substantially U-shaped, having two limb members and one web member, said ports being formed in at least two of said members.

11. A support platform according to claim 10 wherein each web member is formed with means for securing in position objects supported by the platform.

12. A support platform according to claim 11, wherein said means for securing in position comprise apertures formed in said web member, through which apertures pass means for tying said objects in position.

13. A support platform according to claim 1, wherein at least one of the cross-pieces are integrally-formed with means for attachment thereof to supporting structure connected to a base surface.

14. A support platform according to claim 1, wherein means for locating said elements releasably locate said element.

* * * * *